United States Patent [19]
Collins et al.

[11] Patent Number: 4,979,209
[45] Date of Patent: Dec. 18, 1990

[54] INDIVIDUAL SUBSCRIBER LINE MODULE

[75] Inventors: Thomas J. Collins, Wall; Pina Schneider, Ocean Township; Anthony L. Nieves, Bradley Beach; Thomas G. Graham, Ocean, all of N.J.

[73] Assignee: Keptel, Inc., Tinton Falls, N.J.

[21] Appl. No.: 436,767

[22] Filed: Oct. 30, 1989

Related U.S. Application Data

[60] Continuation of Ser. No. 322,361, Mar. 13, 1989, abandoned, which is a division of Ser. No. 139,590, Dec. 30, 1987, abandoned, and a continuation-in-part of Ser. No. 139,590, Dec. 30, 1987, abandoned.

[51] Int. Cl.$^5$ .................... H04M 9/00; H01R 13/44
[52] U.S. Cl. .................... 379/399; 379/442; 439/345; 439/660; 439/133; 439/144
[58] Field of Search .............. 379/399, 412, 429, 387, 379/397, 441, 442; 439/277, 345, 660, 133, 144

[56] References Cited

U.S. PATENT DOCUMENTS

| | | | |
|---|---|---|---|
| 4,588,238 | 5/1986 | Mickelson et al. | 439/277 |
| 4,749,359 | 6/1988 | White | 379/399 X |
| 4,800,588 | 1/1989 | Poster, Jr. | 379/399 X |

OTHER PUBLICATIONS

ML-5, "An Interface System for Today . . . and Tomorrow", Trade Brochure, Apr. 1986.
SNI-5,000, "Tomorrow's Network Interface System . . . Today", Trade Brochure, Oct. 1985.
"Network Interface DeEvices CP-850 Two Pair NID", by Sylvania, Sales Publication, Dec. 1985.

*Primary Examiner*—James L. Dwyer
*Attorney, Agent, or Firm*—R. Gale Rhodes, Jr.

[57] ABSTRACT

Individual security subscriber line module including a generally rectangular, hollow box-like structure including a top, bottom, opposed sides and opposed first and second ends, such structure providing an internal space for receiving an individual circuit; a pair of subscriber wiring terminals mounted on the top for connection to a subscriber line, a plug connected to the pair of subscriber wiring terminals by first electrical conductors; a jack mounted on the top and provided with second electrical conductors for connecting the jack to the incoming telephone company line, the jack for having the plug plugged therein to interconnect the pair of subscriber wiring terminals and thereby the subscriber line to the incoming telephone company line and the plug for being unplugged from the jack to provide a demarcation point between the subscriber line and incoming telephone company line, and upon the plug being unplugged from the jack the jack for receiving the plug of an operating telephone to facilitate determination of whether a fault exists on the subscriber line or the incoming telephone company line; and mounting structure for mounting the module removably to a telephone network interface apparatus for ready removal. The individual subscriber line module may be provided with an individual security cover mounted pivotally on one end of the top of the box-like structure and for being covering and being locked over the pair of subscriber terminals, and may include safety structure for preventing ringing voltage shock hazard to the subscriber.

22 Claims, 8 Drawing Sheets

INDIVIDUAL SUBSCRIBER LINE MODULE

Cross-Reference to Related Application

This application is a continuation application of patent application Ser. No. 07/322,361 filed Mar. 13, 1989, now abandoned, entitled INDIVIDUAL SUBSCRIBER LINE MODULE and assigned to the same assignee as the present application, and which application was divisional and continuation-in-part application of patent application Serial No. 07/139,590 now abandoned filed Dec. 30, 1987 entitled TELEPHONE NETWORK INTERFACE APPARATUS and assigned to the same assignee as the present application.

BACKGROUND OF THE INVENTION

This invention relates generally to new and improved telephone network interface apparatus, and more particularly relates to new and improved telephone network interface apparatus for interconnecting incoming telephone company wiring to subscriber premises wiring and for providing a demarcation point therebetween to determine whether a fault exists on the incoming telephone company wiring or the subscriber premises wiring and which apparatus selectively allows for both individual subscriber and telephone company personnel access to the interior of the apparatus. This invention also relates to a new and improved individual subscriber line module which may be provided with a lockable subscriber security cover for denying other subscribers access to the individual subscriber's terminals.

Since the deregulation of the telephone industry and divestiture of portions of the Bell System, a competitive telephone equipment industry has arisen which, as it further develops, requires for saleability of telephone equipment a decrease in cost and an increase in cost avoidance in new telephone equipment providing increased functionality.

Accordingly, and as is further known to those skilled in the art, numerous prior art telephone network interface apparatus are known which are of the dual or double cover construction including both a telephone company cover and a subscriber cover mounted pivotally to a base. In such construction, as is further known, typically both the telephone company cover and the subscriber cover overlie and cover the entire base which construction requires that both covers be made of sufficient material for such coverage. Thus, there exists a need in the art, for reduced cost, to provide telephone network interface apparatus including both a telephone company door cover and a subscriber cover where at least one of the covers may be made of less material thereby reducing cost while still providing the selective access to the interior of the apparatus for both telephone company personnel and the subscriber.

As is further known to those skilled in the art, there exists a need for a new and improved, relatively inexpensive, individual subscriber line module, which can be mounted removably to telephone network interface apparatus for easy removal, and which includes a pair of subscriber wiring terminals, a plug, and a jack, and which provides internal space for receiving a telephone circuit such as a maintenance termination unit, half-ringer, and the like.

As is further known to those skilled in the art, prior art telephone network interface apparatus are known which include individual subscriber line modules but such prior art modules typically, as is still further known, unwantedly require that an entire module be discarded if a single non-function occurs in any component of the module. Accordingly, there exists a need in this art for new and improved telephone network interface apparatus of increased modularity, and for new and improved individual subscriber line modules which, upon the occurrence of a non-function in a single component of a module requires that less than the entire module be discarded.

As is still further known to those skilled in the art, telephone network interface apparatus are known to the prior art which include individual subscriber line modules provided with individual security covers for denying other subscribers access to an individual subscriber's line. These individual security covers are typically locked in place by a padlock, and the construction of the prior art telephone network interface apparatus is such that in the event the individual subscriber moves away and leaves the padlock locked in place, telephone company personnel upon opening of the telephone company cover can remove the locked padlock and gain access to the subscriber's individual line. However, while such prior art telephone network apparatus perform generally well, there exists a need in such apparatus for improved structure for facilitating removal of the locked padlock by the telephone company personnel in a more efficient and less time consuming manner than is presently required with such prior art telephone network interface apparatus.

As is still further known to those skilled in the art, to ring a subscriber's telephone a ringing voltage is applied to the incoming telephone line; the typical ringing voltage is 120 volts, two seconds on and two seconds off. Upon an individual subscriber line module including a pair of exposed subscriber terminals to which the subscriber premises line is connected, and upon such subscriber terminals being connected to the incoming telephone line through a plug plugged into a jack, the subscriber can be exposed to potential ringing voltage shock hazard upon the subscriber inadvertently touching the subscriber terminals while the ringing voltage is applied thereto. Accordingly, there exists a need in the art to prevent such subscriber potential ringing voltage shock hazard.

SUMMARY OF THE INVENTION

It is the object of the present invention to satisfy the foregoing needs and to provide a new and improved individual subscriber line module which may include an individual security cover and which may be provided with safety means for preventing subscriber potential ringing voltage shock hazard.

Individual security subscriber line modules satisfying the foregoing needs may, in accordance with the teachings of the present invention, include a generally rectangular, hollow box-like structure including a top, bottom, opposed sides and opposed first and second ends, such structure providing an internal space for receiving an individual circuit; a pair of subscriber wiring terminals mounted on the top for connection to a subscriber line, a plug connected to the pair of subscriber wiring terminals by first electrical conductors; a jack mounted on the top and provided with second electrical conductors for connecting the jack to the incoming telephone company line, the jack for having the plug plugged therein to interconnect the pair of subscriber wiring terminals and thereby the subscriber line to the incoming telephone company line and the plug for being unplugged from the jack to provide a demarcation point between the subscriber line and incoming telephone company line, and upon the plug being unplugged from the jack the jack for receiving the plug of an operating telephone to facilitate determination of whether a fault exists on the subscriber line or the incoming telephone company line; and mounting structure for mounting the module removably to a telephone network interface apparatus for ready removal. Such individual subscriber line module may be provided with an individual security cover mounted pivotally on one end of the top of the box-like structure and for being covering and being locked over the pair of subscriber terminals. Further, such individual subscriber line module may include safety structure for preventing potential ringing voltage shock hazard to the subscriber at the subscriber wiring terminals upon telephone ringing voltage being applied over the incoming telephone company line and ultimately to the subscriber wiring terminals.

DESCRIPTION OF THE PREFERRED EMBODIMENTS

Figure 1:
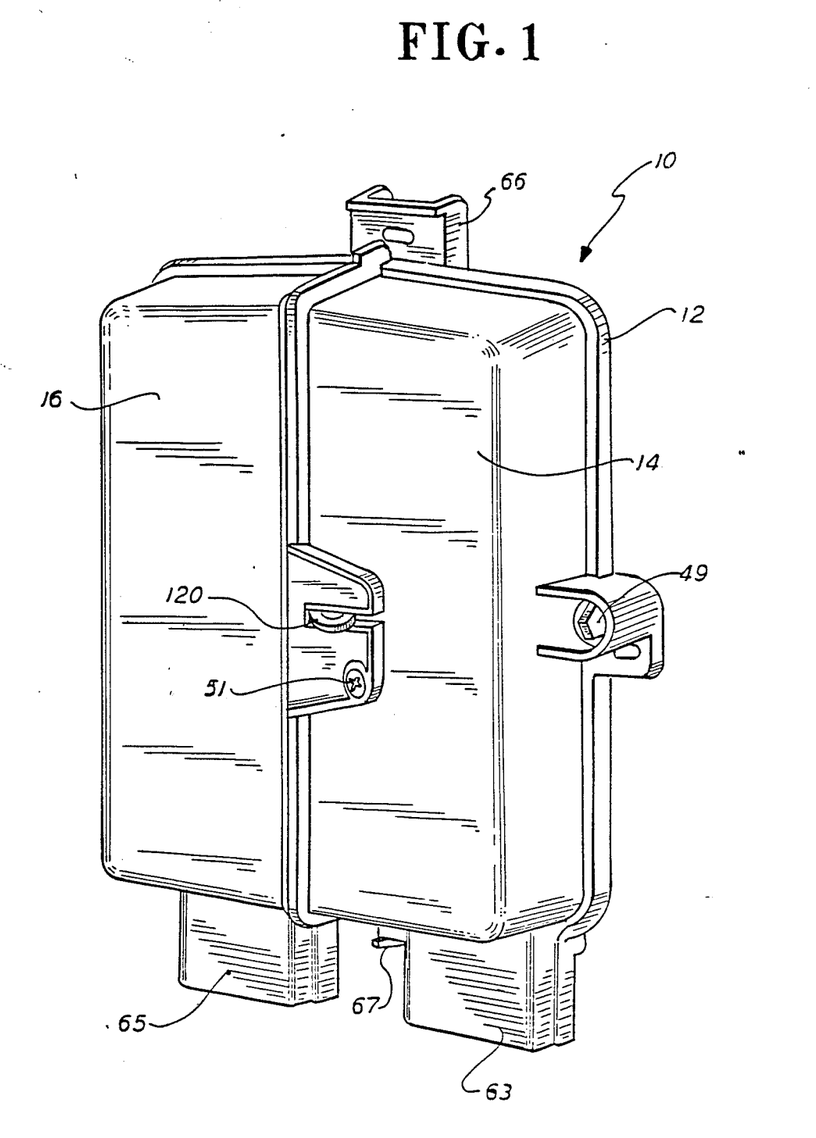
FIG. 1 is a front perspective view of telephone network interface apparatus embodying the present invention.
Figure 2:
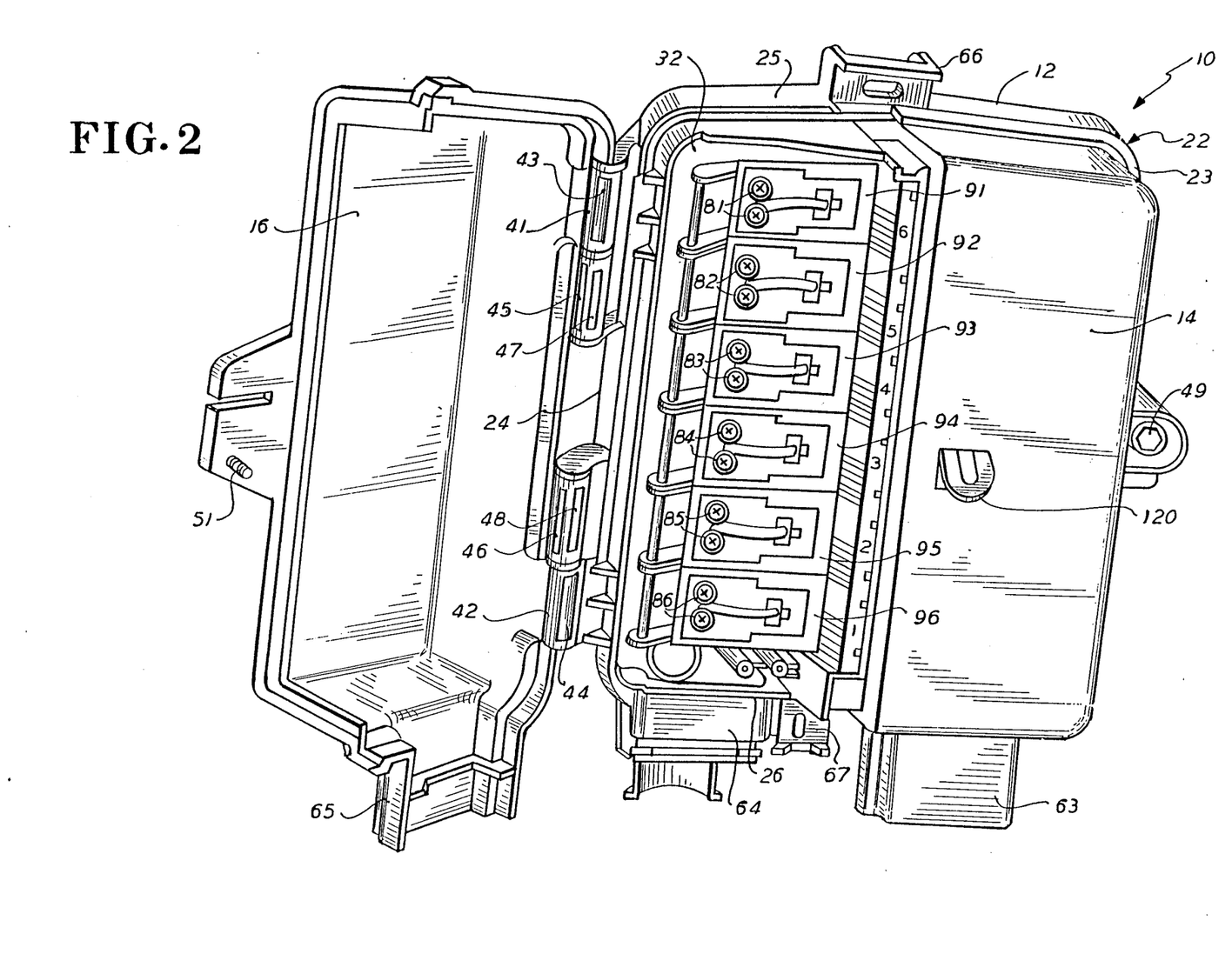
FIG. 2 is a front perspective view of the apparatus showing the subscriber cover in the open position.
Figure 3:
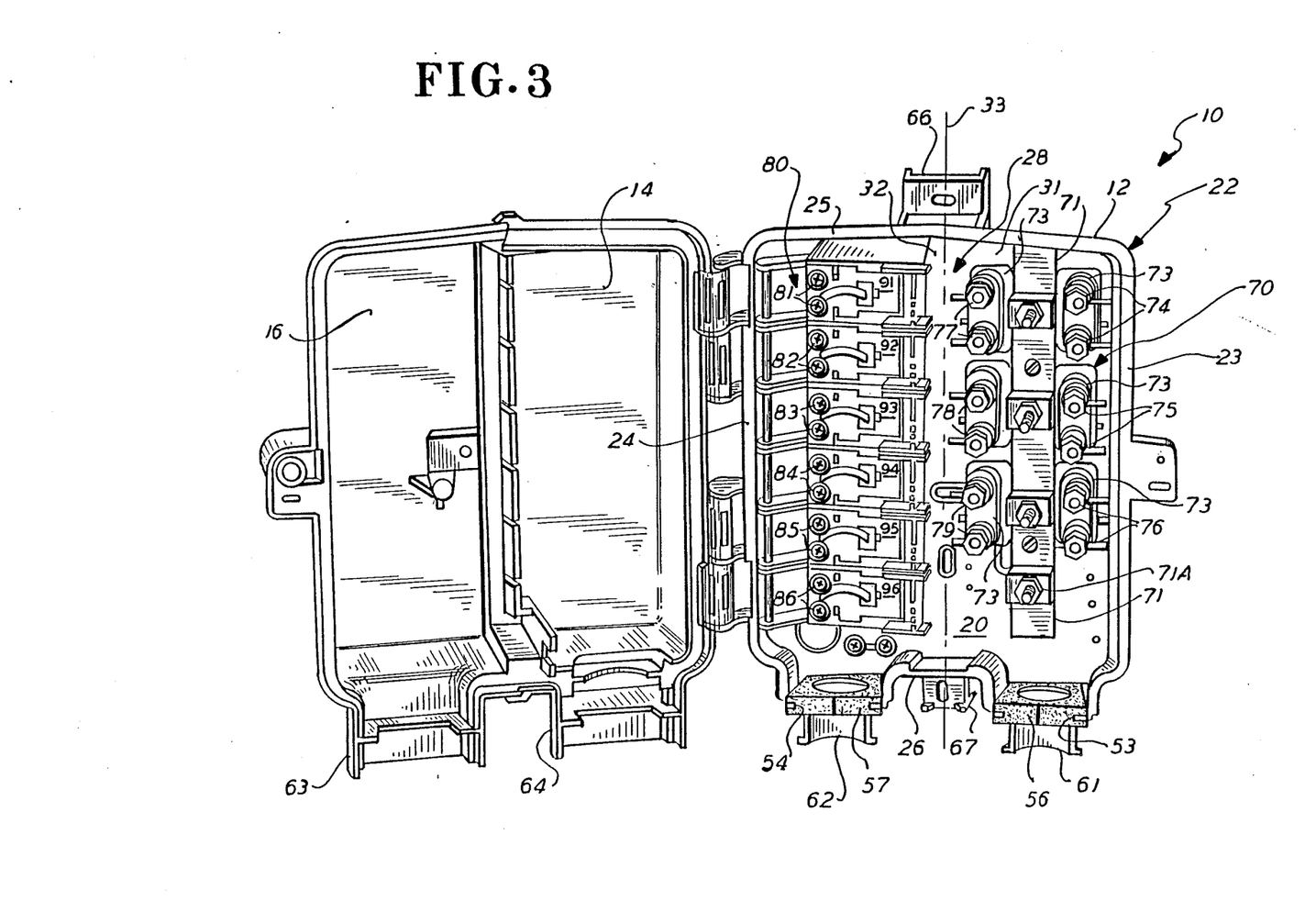
FIG. 3 is a front view of the apparatus showing both the subscriber and telephone company covers in the open positions.

Referring now to FIGS. 1-3, there is shown telephone network interface apparatus embodying the present invention and identified by general numerical designation 10. Apparatus 10 includes a base 12, telephone company cover 14, and subscriber cover 16. The base 12, as best may be understood by reference to FIG. 3, includes a bottom 20 and an outwardly extending wall indicated by general numerical designation 22 circumscribing the bottom; the wall 22 includes opposed first and second wall portions 23 and 24 and opposed third and fourth wall portions 25 and 26. The bottom 20 and wall 22 provide a compartment indicated by general numerical designation 28 which compartment is divided generally into opposed first and second compartment portions 31 and 32 and which compartment division may be readily understood by reference to the diagrammatical dividing line 33 of FIG. 3. The first compartment portion 31 may be understood to be the telephone company compartment portion, and the second compartment portion 32 may be understood to be the subscriber compartment portion.

Figure 4:
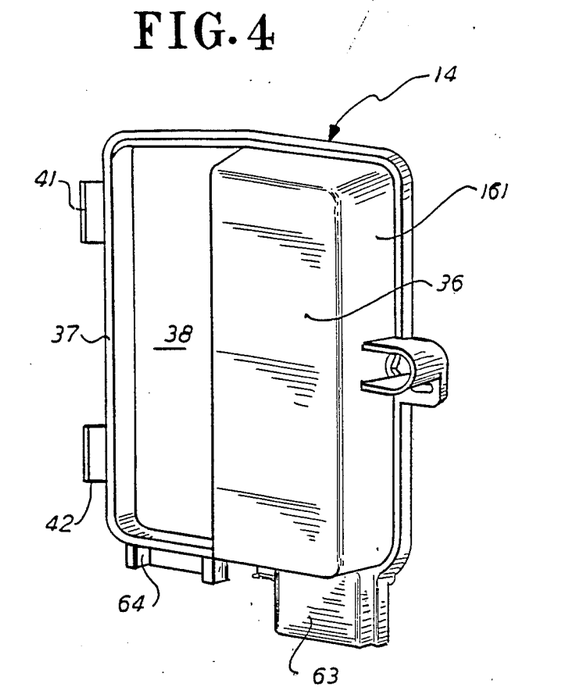
FIG. 4 is a front perspective view of the telephone company cover of the apparatus.
Figure 5:
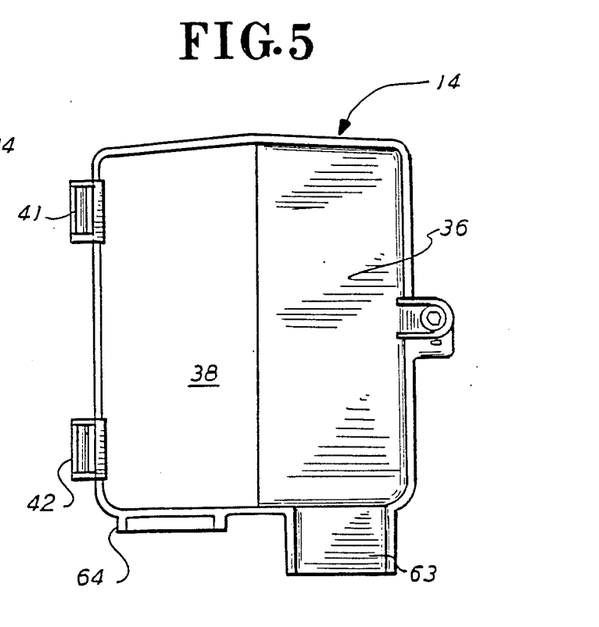
FIG. 5 is a front view of the telephone company cover of the apparatus.
Figure 6:
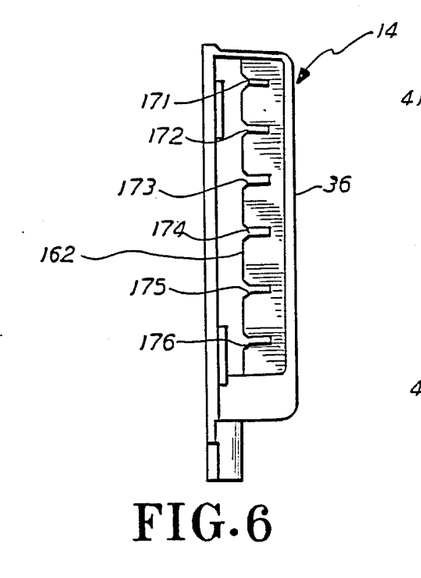
FIG. 6 is a left side view of the telephone company cover of FIG. 5.

Referring now more particularly to the telephone company cover 14 and specifically to FIGS. 4-6, it will be understood that the telephone company cover 14 includes opposed first and second portions 36 and 37 with the first portion 36 being solid and for overlying and closing the first compartment portion 31 (FIG. 3) and with the second cover portion 37 being provided with an opening 38 for overlying and exposing the second compartment portion 32 (FIG. 3) to the exterior upon the telephone company cover 14 being closed. The telephone company cover 14 is for being fastened only to the base 12 such as for example by a hex-headed screw 49 which is not easily removable by a subscriber and which requires a special type of tool not typically possessed by the subscriber but which tool typically is possessed by telephone company personnel. The telephone company cover 14 is provided with outwardly extending hinge members 41 and 42 for wedgedly and pivotally engaging corresponding outwardly extending hinge members 43 and 44 (FIG. 2) provided on the second wall portion 24 of the base 12 to mount the telephone company cover pivotally to the base 12.

Similarly, and referring to FIGS. 1-3, the subscriber cover 16 is solid and is for overlying only the second portion 37 of the telephone company cover 14 and further is for overlying and closing only the second compartment portion 32. The subscriber cover 16 (FIG. 2) is provided with outwardly extending hinge members 45 and 46 for wedgedly and pivotally engaging corresponding outwardly extending hinge members 47 and 48 provided on the second wall portion 24 of the base 12 to pivotally mount the subscriber cover to the base; the subscriber cover is for being fastened only to the telephone company cover such as, for example, by a screw 51.

Fourth wall portion 26 of the base 12 of the telephone network interface apparatus 10, FIG. 3, is provided with first and second openings 53 and 54 for providing respective entrances into the apparatus 10 for telephone company wiring and subscriber premises wiring As shown in FIG. 3, the openings may be provided with grommets 56 and 57 in a manner known to those skilled in the art.

Further, it will be understood, the base 12, FIG. 3, is provided with downwardly extending conduit clamp support members 61 and 62, the telephone company cover 14, FIGS. 3 and 4, is provided with corresponding downwardly extending cover members 63 and 64, and the subscriber cover 16, FIG. 1, is provided with a downwardly extending cover member 65, for covering the conduit clamp supports upon the doors being closed.

As shown in FIGS. 1-3, the base 12 is provided with opposed outwardly extending support members 66 and 67 formed integrally with the base and provided, for example, with holes as shown for receiving fastening members such as screws for mounting the base to a support such as a wall.

In accordance with the further teachings of the present invention, and referring again to FIGS. 2 and 3 and primarily to FIG. 3, it will be further understood that the first compartment portion 31 (e.g. telephone company compartment portion) is for having first terminals indicated by general numerical designation 70 mounted therein for connection to incoming telephone company lines or wiring, and that the second compartment portion 32 (e.g. subscriber compartment portion) is for having second terminals indicated by general numerical designation 80 mounted therein for connection to subscriber premises lines or wiring.

Referring more specifically to the first terminals 70, FIG. 3, it will be understood that these terminals include a ground buss 71 mounted to the bottom 20 of the base 12 such as by screws as shown, a plurality of electrical protection devices 73, such as lightning arrestors, mounted on and electrically connected to the buss 71, and a plurality of pairs of telephone company wiring terminals 74 . . . 79 mounted on the electrical protection devices 73 and which pairs of telephone company wiring terminals are for connection to the incoming telephone company lines or wiring. As is further shown in FIG. 3, the buss 71 may be provided with a separate terminal 71A for connection to earth ground whereby the buss 71 remains grounded at all times particularly while the telephone company lines or wiring is being connected and disconnected to and from the pairs of telephone company wiring terminals 74 . . . 79 by telephone company personnel.

As is shown in both FIGS. 2 and 3, the second terminals 80 may include pairs of subscriber terminals 81 . . . 86 mounted, respectively, on a plurality of laterally disposed replaceable individual subscriber line modules 91 . . . 96 mounted removably to the bottom 20 of the base 12 of the telephone network interface apparatus 10.

Figures 7, 8, 9, 10:
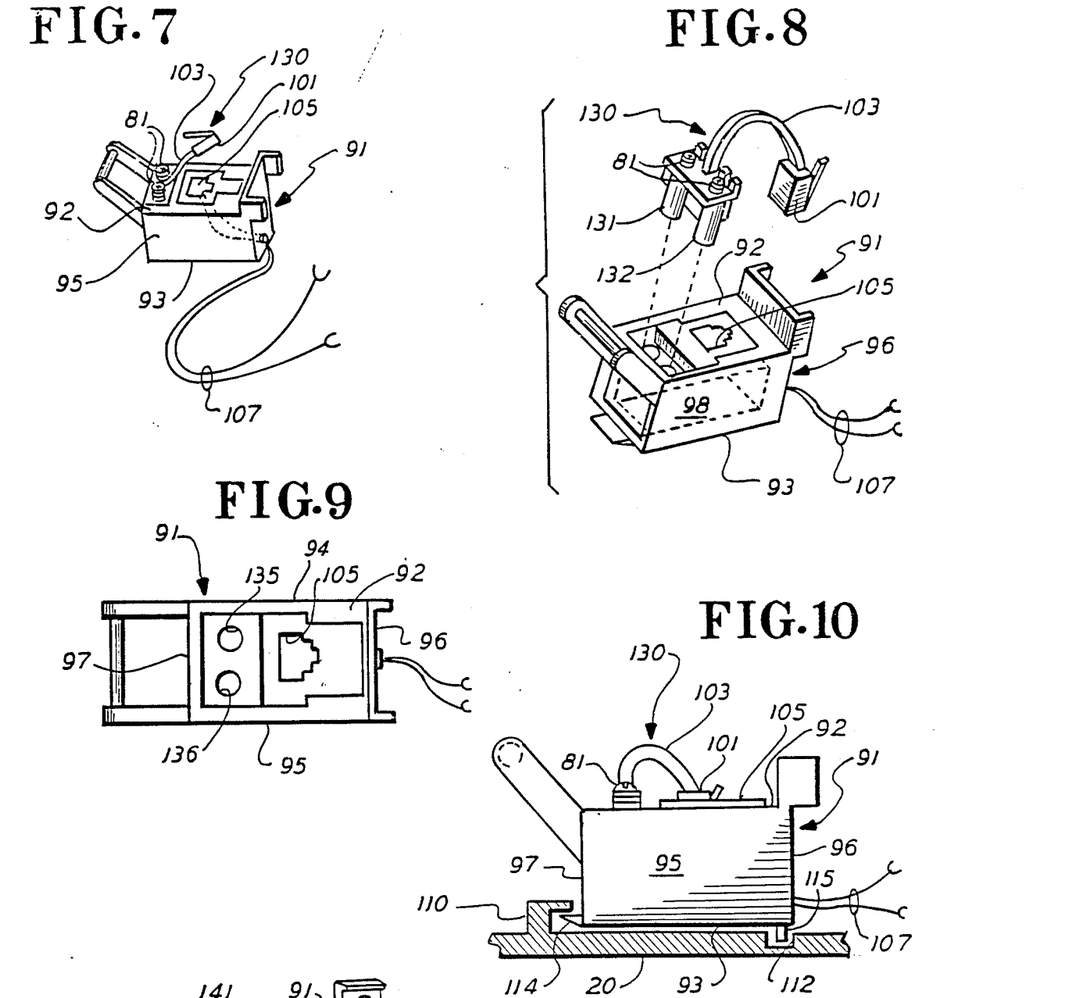
FIG. 7 is a perspective view of a replaceable individual subscriber line module embodying the present invention and including a replaceable subscriber wiring bridge and plug/cable.
FIG. 8 is an exploded view of the replaceable individual subscriber line module of FIG. 7.
FIG. 9 is a top view of the replaceable individual subscriber line module of FIGS. 7 and 8 but with the replaceable subscriber wiring bridge and plug/cable being removed.
FIG. 10 is a side view of the replaceable individual subscriber line module of FIG. 7.

The structure of the replaceable individual subscriber line modules 91 . . . 96 may be understood by reference to FIGS. 7-9 wherein the structure of representative module 91 is shown in detail. Module 91 is a generally rectangular, substantially hollow box-like structure including a top 92, bottom 93, opposed sides 94 and 95 and opposed first and second ends 96 and 97; the structure, as shown in FIG. 8, provides an internal space 98 for receiving a telephone circuit, sometimes referred to in the art as station electronics, such as, for example, a maintenance terminating unit, half ringer or the like, suitably interconnected electrically in the manner also known to the art. The pair of subscriber wiring terminals 81 are mounted on the module top 92, FIG. 7, and are for being connected as noted above to an individual subscriber line (e.g. tip and ring wires) of the subscriber premises lines or wiring. A plug 101 is connected to the pair of subscriber terminals 81 by the electrical conductors 103, and the plug is for being removably plugged into a jack 105 also mounted on the module top 92; the jack 105 is provided with electrical connectors 107 for connecting the jack with the pair of telephone terminals 77 shown in FIG. 3. The jack 105 is for removably receiving the plug 101 to interconnect the individual subscriber line connected to the terminals 81 to the telephone company wiring connected to the terminals 77 to provide interconnection therebetween, and the plug 101 is for being removed from the jack 105 to provide a demarcation point between the individual subscriber line and the telephone company wiring and, upon the plug 101 being removed from the jack 105, the jack is for receiving an operating telephone plug (not shown) to determine whether a fault exists on the subscriber premises wiring or the telephone company wiring.

A better understanding of the modularity, i.e. replaceability and removable mounting of the individual subscriber line modules 91 . . .96, may be obtained by reference to FIG. 10 wherein it will be noted that the bottom 20 of the base 12 is provided with an upwardly extending inverted L-shaped member 110 and an inwardly extending hole 112 and that the module 91 is provided with an outwardly extending member 114 and a downwardly extending member 115. For removable mounting of the module to the base, the outwardly extending member 114 is wedgedly received under the inverted L-shaped member 110 and the downwardly extending member 115 is received within the hole 112.

Thus, it will be understood further that in accordance with the further teachings of the enhanced modularity of the present invention, the individuality and removable mounting of the modules 91 . . . 96 permit each individual module to be replaced, one at a time, in the event that any component of the module becomes non-functional while retaining the balance of the telephone network interface apparatus 10. More particularly, and by way of example, should any component of the individual subscriber line module 91 (FIGS. 7-10) become non-functional, the subscriber line may be disconnected from the wire screw terminals 81, the electrical connectors 107 disconnected from the telephone terminals 77 (FIG. 3), and the individual subscriber line module 91 removed from the apparatus 10 by pulling up on the first end of the module 91 (FIG. 10) to pull the downwardly extending module member 115 from the hole 112 provided in the bottom 20 and to thereafter unwedge the outwardly extending module member 114 from the inwardly extending inverted L-shaped member 110 provided on the apparatus bottom 20.

In accordance with still further teachings of the present invention, it will be understood that even further modularity is provided to the replaceable individual subscriber modules of the present invention, and hence to the telephone network interface apparatus 10 of the present invention by embodying the subscriber line terminals (e.g. terminals 81...86 of FIG. 3) as a replaceable wiring bridge plug/cable, such as the individual replaceable wiring bridge plug/cable identified by general numerical designation 130 shown in FIGS. 7, 8 and 10 and with regard to representative module 91. More particularly, the individual replaceable wiring bridge 130 includes a pair of generally cylindrical members 131 and 132 (FIG. 8) having the pair of subscriber screw wire terminals 81 mounted thereon and the plug 101 and interconnecting conductors or cable 103. The module 91, FIGS. 8 and 9, is provided intermediate the top 92 and bottom 93 with a pair of cylindrical openings or holes 135 and 136 complementary in shape to and for wedgedly receiving the pair of cylindrical members 131 and 132 for removably mounting the individual subscriber wiring bridge 130 in the module 91. This further individuality and modularity of the bridge 130 has been found to be further advantageous since it has been found that most typically it is not the subscriber line terminals 81 which become non-functional in the individual subscriber line modules but instead, typically, it is other components of the replaceable individual subscriber line modules which become non-functional such as, for example, a telephone circuit received within the internal space 98 (FIG. 8) of an individual module. Hence, upon, for example, such telephone circuit becoming non-functional, the entire replaceable individual subscriber line module 91 need not be discarded, and instead the individual replaceable subscriber wiring bridge 130 may be removed from the module while the individual subscriber line remains connected to the terminals 81 and the remaining module discarded while retaining and saving the wiring bridge 130.

Referring again generally to the telephone network interface apparatus 10, and again to FIGS. 1-3, it will be understood that this embodiment of the invention is particularly useful in a multi-line subscriber installation such as a small business or other multi-line subscriber installation wherein, in the embodiment shown, the telephone network interface apparatus 10 accommodates from one to six subscriber lines. The subscriber may obtain access to the replaceable individual subscriber line modules 91...96, and particularly to the pairs of terminals and plugs mounted on the modules, by merely unfastening the fastener or screw 51 to open the subscriber door 16 to the open position shown in FIG. 2 and can do so while the telephone company door 14 remains closed since the subscriber door 16 is fastened only to the telephone company door 14. For security to the multi-lines, the subscriber may utilize a suitable padlock by inserting its shackle through the staple 120 (FIGS. 1 and 2) and the telephone company personnel can easily override the locked padlock by merely unfastening the fastener 49 which opens both the locked subscriber door 16 and the telephone company door 14, as shown in FIG. 3, to provide the telephone company personnel with access to the complete interior of the apparatus 10.

Figure 11:
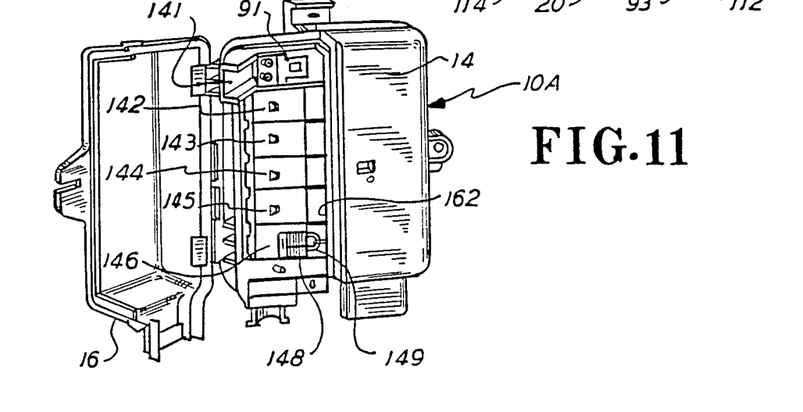
FIG. 11 is a front perspective view of an alternate embodiment of telephone network interface apparatus embodying the present invention and with the subscriber cover being shown in the open position.

An alternate embodiment of telephone network interface apparatus embodying the present invention is illustrated in FIG. 11 and indicated by general numerical designation 10A. It will be understood that structure of apparatus 10A identical to structure of the above-described apparatus 10 has been given identical numerical designations for convenience of reference. Generally, it will be understood that telephone network interface apparatus 10A is particularly useful in multi-subscriber line applications such as found in an apartment house, business office, condominium and the like, where it is desirable to provide each individual subscriber with security against access to the individual subscriber's line wiring terminals by other subscribers. This individual security, generally, is provided by the individual security covers 141...146 shown in FIG. 11.

Figure 16:
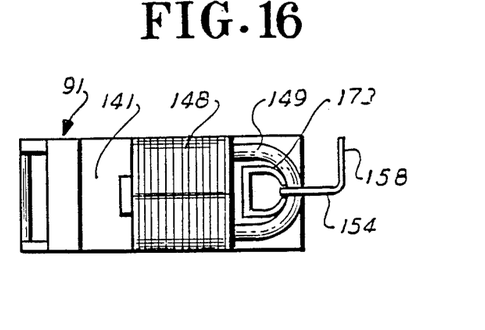
FIG. 16 is a top view of the replaceable individual subscriber line module of FIGS. 12, 13 and 14 showing a locked padlock positioned on top thereof.
Figure 17:
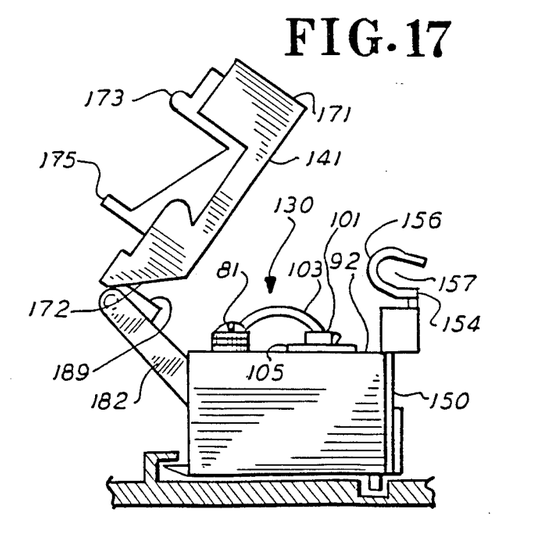
FIG. 17 is a side view of the replaceable individual subscriber line module of FIGS. 11, 12 and 13 showing the security cover in the unlocked and open position.
Figure 18:
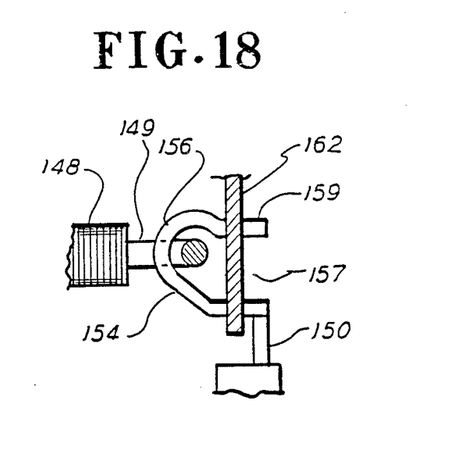
FIG. 18 is a partial side view, partially in cross-section, showing the cooperating means of the present invention for locking the security cover of the alternate embodiment replaceable individual subscriber line module to deny access to other subscribers.

More particularly with regard to the individual security covers and referring to FIGS. 12-17, and to representative individual subscriber module 91 shown therein, the module is provided with the individual security cover 141 mounted pivotally on the second end 97 of the module which security cover is specifically for covering the pair of subscriber wiring terminals 81, plug 101 and jack 105 (FIG. 17). Generally, it will be understood further that the module, e.g. module 91, and the telephone company cover 14 (FIG. 11) are provided with cooperating means for providing a staple for receiving the shackle of a padlock (e.g. padlock 148 of FIGS. 11 and 16 having shackle 149) to lock the individual security cover over the module upon the telephone company cover 14 being fastened to the base 12 and, which cooperating means, upon the telephone company cover 14 being unfastened and open, permitting telephone company personnel to remove the locked padlock from the staple to permit the telephone company personnel to open the individual security cover. More particularly with regard to such cooperating means, and referring to FIG. 15, a security stable 150 including a lower portion 152 and an upper gooseneck portion 154 is provided. The lower portion 152 of the security staple 150 is mounted, such as by a suitable wedge fit, to the first end 96 of the module 91 and the upper gooseneck portion 154 includes a closed curved rearward portion 156 extending towards the module second end 97, an open forward portion 157, and an integrally formed lateral portion 158 disposed substantially perpendicular to the gooseneck portion 154. As best may be understood from FIGS. 4 and 6, the telephone company cover 14 includes opposed inwardly extending first and second wall portions 161 and 162 with the inwardly extending second wall portion 162 extending inwardly generally along the demarcation line 33 (FIG. 3) which divides the compartment 28 into first (telephone company) and second (subscriber) compartments 31 and 32 as described above. As best may be seen from FIG. 6, the inwardly extending second wall portion 162 of the telephone company cover 14 is provided with a plurality of inwardly extending slots 171 . . .176 for receiving a forward portion 159 (FIG. 15) of the gooseneck portion 154 of the security staple 150 and for permitting sufficient of the closed curved rearward portion 156 of the gooseneck portion 154 to be exposed, note FIG. 18, upon the telephone company cover 14 being closed to permit the closed curved rearward portion 156 of the staple to receive the padlock shackle 149 of the padlock 148 to lock the individual security cover 141 closed upon the telephone company 14 being closed and fastened to the base 12. Upon the individual subscriber leaving or moving away and leaving the padlock 148 locked, it will be understood further in accordance with the further teachings of the present invention that upon the telephone company cover 14 being unfastened from the base and opened by telephone company personnel, the gooseneck portion 154 and lateral portion 158 of the security staple 150 is exposed to permit the telephone company personnel to remove the padlock shackle 149 from the gooseneck and lateral portions 154 and 158 while the padlock 148 remains locked and thereby open the individual security cover 141; it will be understood and appreciated that the padlock 148 can be removed as described by telephone company personnel by merely opening the telephone company cover 14 and that no other act or work operation is required to remove the padlock and open the individual security cover.

Figure 12:
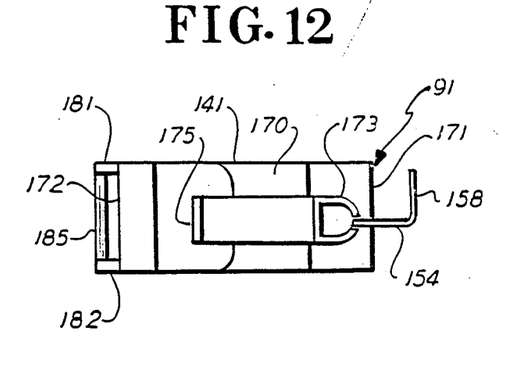
FIGS. 12, 13 and 14 are, respectively, top, side elevation, and right end views of an alternate embodiment of a replaceable individual subscriber line module embodying the present invention and including a top security cover.
Figure 13:
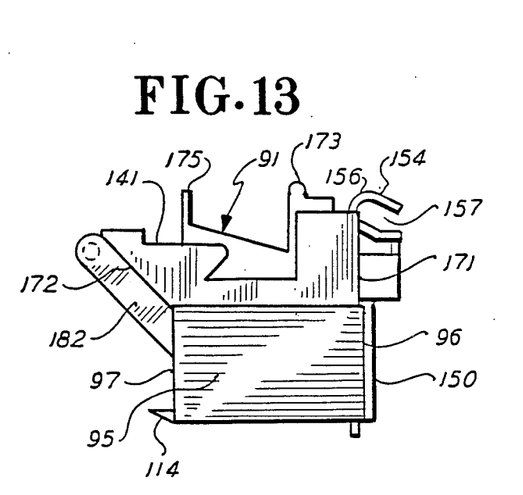
Figure 14:
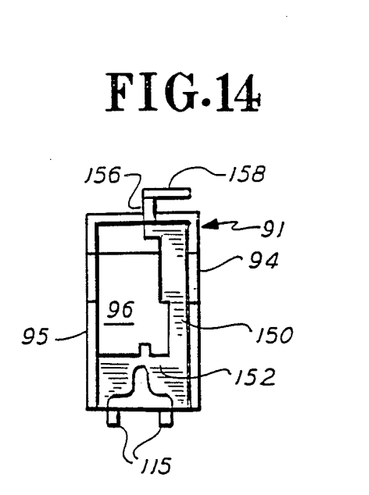
Figure 15:
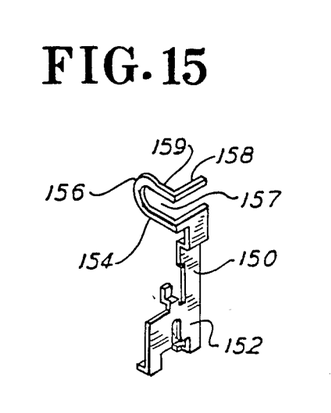
FIG. 15 is a perspective view of a security staple embodied in the replaceable individual subscriber line module of FIGS. 12, 13 and 14.

It will be understood further, and referring particularly to FIGS. 12, 13 and 16, that the top 170 of the individual security cover 141 is provided with opposed first and second ends 171 and 172 corresponding to the opposed first and second ends 96 and 97 of the module 91 and the security cover 141 is provided adjacent its first end 171 with an upwardly extending member 173 complementary in shape to the interior of the padlock shackle 149 and is provided intermediate its first and second ends 171 and 172 with an upwardly extending second member 175; upon the padlock 148 being locked the first member 173 is for receiving the padlock shackle 149 as shown in FIG. 16 and the first 173 and second 175 members are for positioning the locked padlock 148 atop the individual security cover top 170.

As may be understood further by reference to FIGS. 7, 9, 10, 12, 13 and 17, the second end 97 of the module 91 is provided with a pair of generally upwardly and outwardly extending arms 181 and 182 having a shaft 185 extending therebetween and the second end 172 of the security cover 141 is provided with an outwardly extending U-shaped portion 189 for wedgedly and rotatably receiving the shaft 185 to thereby mount the security cover 141 pivotally on the second end 97 of the module 91.

As may be understood still further in accordance with the teachings of the present invention, and referring to FIGS. 7, 8 and 9, and particularly FIG. 9, a space is provided between the arms 181 and 182 and shaft 185 sufficiently large to permit the individual subscriber wiring bridge 130 (FIG. 8) to pass through the space 188 and be removed from the module 91 while the individual subscriber line attached to the screw wire terminals 81 remains connected thereto whereby the individual security module 91 may be discarded upon a component thereof, such as the telephone circuit received within the space 98 (FIG. 8) being non-functional; it being understood that the individual subscriber line (not shown) is first passed through the space 88 prior to connection to the subscriber terminals 81 of the wiring bridge 130.

Referring again to the telephone cover 14 and subscriber 16, and to FIGS. 1, 4 and 5, it will be understood that, in accordance with the teachings of the present invention, by providing the opening 38 with the second portion 37 of the telephone cover 14, and by having the subscriber cover 16 of a size to cover only the opening 38 and the second (subscriber) compartment 32, less material is required than would be were both covers to be solid and overlie or cover the entire compartment 28; hence a cost saving is achieved.

Further improved replaceable alternate embodiments of individual subscriber line modules according to the present invention are illustrated respectively in FIGS. 19 and 20 and FIGS. 21-24 and are given respective general numerical designations 91A and 91B. Generally, it will be understood that these alternate individual subscriber line module embodiments perform the same functions as the individual subscriber line module embodiment 91 illustrated in FIGS. 7-10 and FIGS. 12-17, particularly FIGS. 12-17, and accordingly structure shown in FIGS. 19-24 identical, or substantially identical, to the structure shown in FIGS. 7-10 and FIGS. 12-17, particularly FIGS. 12-17, is given the same numerical designations. It will be further understood generally that the individual subscriber line module alternate embodiments 91A and 91B perform the further function of preventing potential telephone ringing voltage shock hazard to a subscriber at the pair of subscriber wiring terminals 81, shown in FIGS. 19 and 20 and 22 and 23.

By way of background and to provide a better basis for understanding the safety feature improvement of alternate individual subscriber line module embodiments 91A and 91B, reference is again made to individual subscriber line module 91 described above and illustrated particularly in FIGS. 7 and 17. By way of further background, as known to those skilled in the art, to ring a subscriber's telephone, a ringing voltage, typically 120 volts, 2 seconds on and 2 seconds off, is applied to the incoming telephone line to which the subscriber telephone is connected. Accordingly, and referring to FIGS. 7 and 17, upon the subscriber telephone 200 being connected to the subscriber terminals 81 by the individual subscriber premises wiring or line 201, upon the plug 101 being plugged into the jack 105, upon the electrical conductors 107 being connected for example to pair of telephone terminals 77 in FIG. 3, and thereby to an incoming telephone line upon telephone ringing voltage being applied to the incoming telephone line and thereby to the pair of subscriber terminals 81, should a subscriber be, for example, touching the pair of subscriber terminals 81 in the process of connecting or disconnecting the subscriber premises line 201, or be touching the telephone terminals 77 inadvertently in the process of plugging or unplugging the plug 101 from the jack 105, the subscriber will be exposed to potential telephone voltage ringing shock hazard at the subscriber terminals 81. Accordingly, it will be generally understood that the safety feature provided by the improved alternate embodiments of individual subscriber line modules 91A and 91B shown in FIGS. 19-20 and FIGS. 21-24, respectively, is for preventing such potential telephone ringing voltage shock hazard to the subscriber at pair of subscriber terminals 81 by denying the subscriber access to the pair of subscriber terminals 81 until the plug 101 is unplugged from the jack 105 thereby preventing application of the telephone ringing voltage to the subscriber terminals 81 at any time the subscriber has access to the subscriber terminals 81.

More particularly, and referring again generally to FIGS. 19-24, this safety feature of the alternate individual subscriber line modules 91A and 91B is provided by mounting the plug 101 on the individual security covers 141A and 141B such that upon the individual security covers 141A and 141B being opened sufficiently to provide the subscriber access to the pair of subscriber terminals 81, the plug 101 is unplugged from the jack 105 thereby preventing application of the telephone ringing voltage to the subscriber terminals 81 while the subscriber has access thereto.

Figure 19:
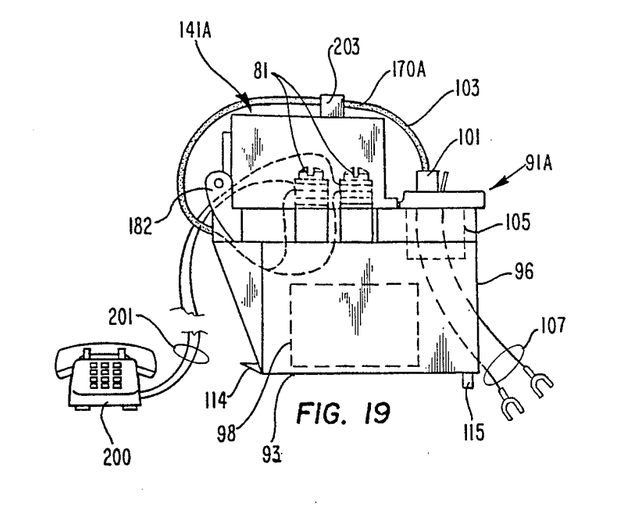
FIG. 19 is a side elevational view of an alternate embodiment of a replaceable individual subscriber line module embodying the present invention and including an individual security cover shown in the open position.
Figure 20:
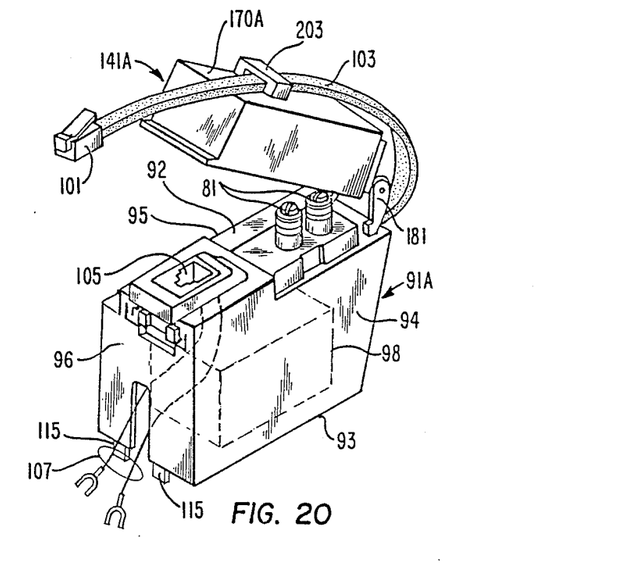
FIG. 20 is an elevational view of the individual subscriber line module shown in line 19 with the individual subscriber cover shown in the open position.
Figure 21:
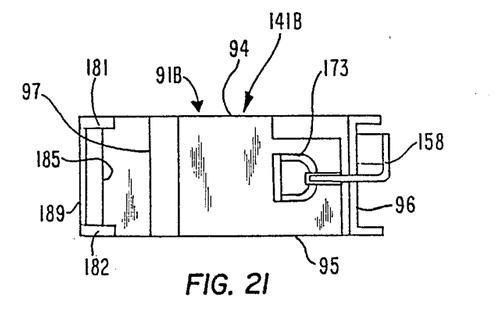
FIG. 21 is a top view of a further alternate embodiment of replaceable individual subscriber line module embodying the present invention with the individual subscriber cover thereof shown in the closed, position.

In the alternate embodiment individual subscriber line module 91A, FIGS. 19 and 20, the plug 101 and electrical conductors 103 are mounted on top of the individual security cover 141A by the electrical conductors 103 being mounted under the generally inverted U-shaped member 203 provided on the cover top 170A of the individual security cover 141A. In alternate embodiment 91B, note particularly FIGS. 22 and 23, the telephone plug 101 and electrical conductors 103 are mounted underneath the cover top 170B of the individual security cover 141B by the electrical conductors 103 being mounted over the mounting member 205 provided underneath the individual security cover top 170B.

Figure 22:
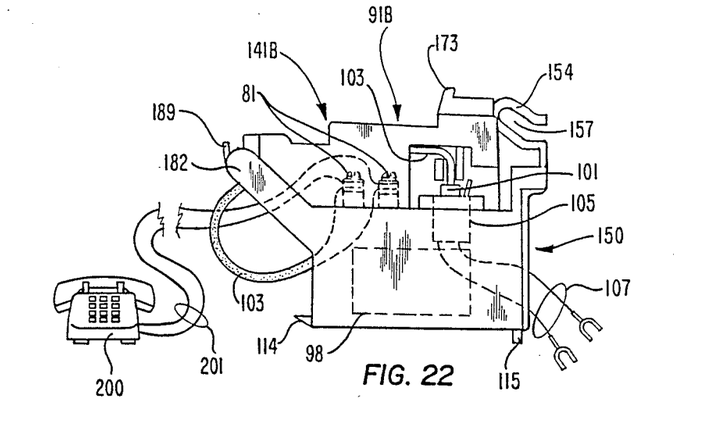
FIG. 22 is a side elevational view of the individual subscriber line module shown in FIG. 21 with the individual subscriber cover thereof shown in the open position.
Figure 23:
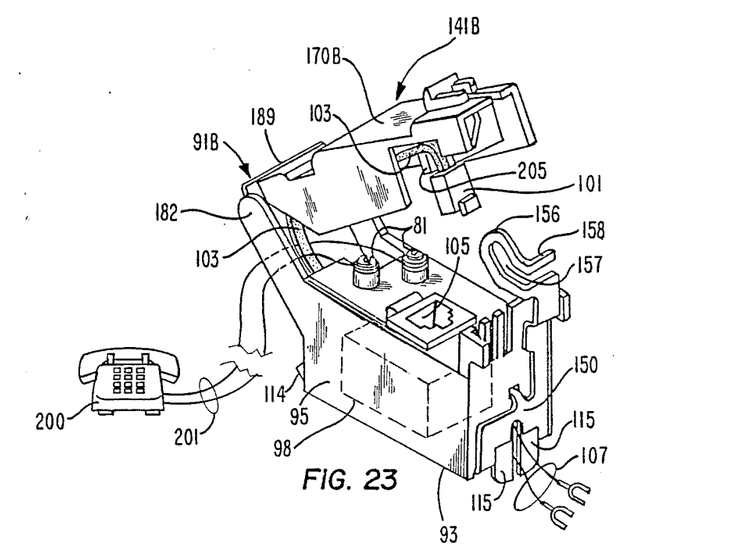
FIG. 23 is a perspective view of the alternate individual subscriber line module of FIGS. 21 and 22 with the individual subscriber cover shown in the open position.
Figure 24:
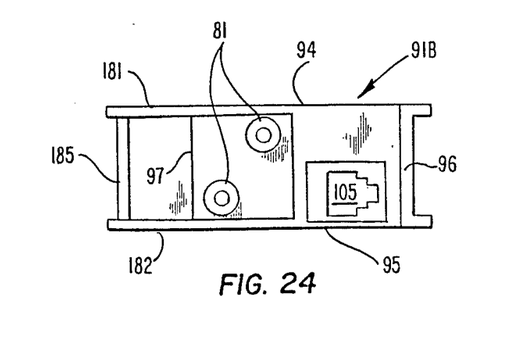
FIG. 24 is a top view of the alternate individual subscriber line module embodiment of FIGS. 21-23 with the individual subscriber cover removed.

Accordingly, in brief review, and referring to FIGS. 19 and 20, and alternate individual subscriber line module embodiment 91A it will be understood that the plug 101 cannot be plugged into the jack 105 and the telephone ringing voltage applied to the subscriber terminals 81 until the individual security cover 141A is closed over the subscriber terminals 81 thereby denying the subscriber access to the subscriber terminals 81 at any time the telephone ringing voltage can be applied through the jack 105 and plug 101 to the subscriber terminals 81 and at any time the individual security cover 141A is opened sufficiently to provide the subscriber with access to the subscriber terminals 81, the plug 101 is unplugged from the jack 105 as shown in FIG. 20, and the telephone ringing voltage cannot be applied to the subscriber wiring terminals 81. Similarly, as may be best understood by reference to FIG. 23 with regard to alternate individual subscriber line module 91B, upon the individual security cover 141B being opened sufficiently to provide the subscriber with access to the subscriber terminals 81, the plug 101 is unplugged from the jack 105 thereby preventing the application of telephone ringing voltage to the subscriber terminals 81, and, as shown in FIG. 22, to plug the plug 101 into the jack 105 the individual security cover 141B must be closed thereby denying the subscriber access to the subscriber terminals 81 at any time the telephone ringing voltage can be applied to the subscriber terminals. Otherwise, it will be understood that the alternate individual subscriber line module embodiments 91A and 91B function the same, or substantially the same, as the individual subscriber line module 91 described above and illustrated in FIGS. 7–10 and FIGS. 12–17.

It will be understood by those skilled in the art that many modifications and variations may be made in the present invention without departing from the spirit and the scope thereof.

What is claimed is:

1. Module for being mounted removably to telephone network interface apparatus and for interconnecting at least one individual subscriber premises line with at least one individual incoming telephone company line, comprising:
   a generally rectangular, hollow box-like structure including a top, opposed sides and opposed first and second ends;
   a replaceable subscriber wiring bridge including a pair of generally cylindrical members having a pair of screw wire terminals mounted at the top thereof for connection to said individual subscriber premises line;
   said top provided with a pair of cylindrical holes complementary in shape to and for wedgedly receiving said pair of cylindrical members for removably mounting said subscriber wiring bridge in said module;
   at least one plug connected to said pair of subscriber wiring terminals by first electrical conductors;
   at least one jack mounted on said top and provided with second electrical conductors for connecting said jack to said incoming telephone company line, said jack for having said plug plugged therein to interconnect said pair of subscriber wiring terminals and thereby said subscriber premises line to said incoming telephone company line and said plug for being unplugged from said jack to provide a demarcation point between said subscriber premises line and said incoming telephone company line, and upon said plug being unplugged from said jack said jack for receiving the plug of an operating telephone to facilitate determination of whether a fault exists on said subscriber premises line or said incoming telephone company line; and
   mounting means for mounting said module removably to said telephone network interface apparatus.

2. Module for being mounted removably to telephone network interface apparatus and for interconnecting at least one individual subscriber premises line with at least one individual incoming telephone company line, comprising:
   a generally rectangular, hollow box-like structure including a top, opposed sides and opposed first and second ends;
   at least one pair of subscriber terminals mounted on said top for connection to said subscriber premises line;
   at least one plug connected to said pair of subscriber wiring terminals by first electrical conductors;
   at least one jack mounted on said top and provided with second electrical conductors for connecting said jack to said incoming telephone company line, said jack for having said plug plugged therein to interconnect said pair of subscriber wiring terminals and thereby said subscriber premises line to said incoming telephone company line and said plug for being unplugged from said jack to provide a demarcation point between said subscriber premises line and said incoming telephone company line, and upon said plug being unplugged from said jack said jack for receiving the plug of an operating telephone to facilitate determination of whether a fault exists on said subscriber premises line or said incoming telephone company line;
   security cover mounted pivotally at said first end of said box-like structure and for covering and being locked over said pair of subscriber terminals; and
   mounting means for mounting said module removably to said telephone network interface apparatus.

3. Module according to claim 2 further comprising:
   a security staple including a lower portion secured to said second end of said box-like structure and an upper gooseneck portion extending above said top, said gooseneck portion including a closed, curved rearward portion extending towards said first end of said box-like structure and an open forward portion extending towards said first end of said box-like structure, and including an integrally formed lateral portion disposed substantially perpendicular to said gooseneck portion, and said gooseneck portion for receiving the shackle of a padlock for locking said security cover over said pair of subscriber wiring terminals.

4. Module according to claim 3, wherein said security cover includes a top and first and second opposed ends, said first end of said security cover mounted pivotally to said first end of said box-like structure and said top provided adjacent said security cover second end with an upwardly extending first member complementary in shape to the interior of said padlock shackle and provided intermediate said security cover opposed ends with an upwardly extending second member, upon said padlock being locked said first member for receiving said padlock shackle and said first and second members for positioning said locked padlock atop said security cover top.

5. Module according to claim 2 wherein said first end of said box-like structure is provided with a pair of generally upwardly and outwardly extending arms having a shaft extending therebetween, and wherein said first end of said security cover is provided with an outwardly extending U-shaped portion for wedgedly and rotatably receiving said shaft to mount said security cover pivotally on said shaft.

6. Module according to claim 5 wherein said pair of subscriber terminals comprise a replaceable subscriber wiring bridge including a pair of generally cylindrical members having a pair of screw wire terminals mounted at the top thereof for connection to said subscriber premises line and wherein said plug is connected to said pair of screw wire terminals by said first electrical conductors, wherein said top is provided with a pair of cylindrical holes complementary in shape to and for wedgedly receiving said pair of cylindrical members for removably mounting said individual subscriber wiring bridge in said module, and wherein said generally upwardly extending arms and said shaft are separated sufficiently to provide a space therebetween sufficiently large to permit said subscriber wiring bridge to be removed from said module and passed through said space while said subscriber premises line remains connected to said pair of screw wiring terminals.

7. Module for being mounted removably to telephone network interface apparatus and for interconnecting at least one individual subscriber premises line with at least one individual incoming telephone company line, said telephone network interface apparatus including a base provided with an upwardly extending inverted L-shaped member and an inwardly extending hole, comprising:
  a generally rectangular, hollow box-like structure including a top, opposed sides and opposed first and second ends;
  at least one plug connected to said pair of subscriber wiring terminals by first electrical conductors;
  at least one pair of subscriber terminals mounted on said top for connection to said subscriber premises line;
  at least one jack mounted on said top and provided with second electrical conductors for connecting said jack to said incoming telephone company line, said jack for having said plug plugged therein to interconnect said pair of subscriber wiring terminals and thereby said subscriber premises line to said incoming telephone company line and said plug for being unplugged from said jack to provide a demarcation point between said subscriber premises line and said incoming telephone company line, and upon said plug being unplugged from said jack said jack for receiving the plug of an operating telephone to facilitate determination of whether a fault exists on said subscriber premises line or said incoming telephone company line; and
  mounting means including a downwardly extending member for being received in said hole and an outwardly extending member for being wedgedly received under said inverted L-shaped member for mounting said module removably to said telephone network interface apparatus.

8. Module for being mounted removably to telephone network interface apparatus and for interconnecting at least one individual subscriber premises line with at least one individual incoming telephone company line, comprising:
  a generally rectangular, hollow box-like structure including a top, opposed sides and opposed first and second ends;
  at least one pair of subscriber terminals mounted on said top for connection to said subscriber premises line;
  at least one plug connected to said pair of subscriber wiring terminals by first electrical conductors;
  at least one jack mounted on said top and provided with second electrical conductors for connecting said jack to said incoming telephone company line, said jack for having said plug plugged therein to interconnect said pair of subscriber wiring terminals and thereby said subscriber premises line to said incoming telephone company line and said plug for being unplugged from said jack to provide a demarcation point between said subscriber premises line and said incoming telephone company line, and upon said plug being unplugged from said jack said jack for receiving the plug of an operating telephone to facilitate determination of whether a fault exists on said subscriber premises line or said incoming telephone company line;
  safety means for preventing potential telephone ringing voltage shock hazard to a subscriber at said subscriber wiring terminals upon telephone ringing voltage being applied to said incoming telephone company line; and
  mounting means for mounting said module removably to said telephone network interface apparatus.

9. Module for being mounted removably to telephone network interface apparatus and for interconnecting at least one individual subscriber premises line with at least one individual incoming telephone company line, comprising:
  a generally rectangular, hollow box-like structure including a top, opposed sides and opposed first and second ends;
  at least one pair of subscriber terminals mounted on said top for connection to said subscriber premises line;
  at least one plug connected to said pair of subscriber wiring terminals by first electrical conductors;
  at least one jack mounted on said top and provided with second electrical conductors for connecting said jack to said incoming telephone company line, said jack for having said plug plugged therein to interconnect said pair of subscriber wiring terminals and thereby said subscriber premises line to said incoming telephone company line and said plug for being unplugged from said jack to provide a demarcation point between said subscriber premises line and said incoming telephone company line, and upon said plug being unplugged from said jack said jack for receiving the plug of an operating telephone to facilitate determination of whether a fault exists on said subscriber premises line or said incoming telephone company line;

safety means for denying a subscriber access to said pair of subscriber terminals until said plug is unplugged from said jack to disconnect said pair of subscriber terminals from said incoming telephone company line and the application of said telephone ringing voltage to said pair of subscriber terminals is prevented; and mounting means for mounting said module removably to said telephone network interface apparatus.

10. Module according to claim 8 or 9 wherein said safety means comprise a security cover mounted pivotally on said top of said box-like structure and wherein said plug is mounted on said cover, said security cover for being pivoted towards said top to permit said plug to be plugged into said jack and upon said security cover being pivoted towards said top sufficiently to permit said plug to be plugged into said jack said security cover covering said subscriber terminals to deny said subscriber access thereto, and upon said cover being pivoted away from said top sufficiently to provide said subscriber access to said pair of subscriber terminals said plug being unplugged from said jack.

11. Module according to claim 10 wherein said security cover includes a cover top and wherein said first electrical conductors and said plug are mounted, over said cover top.

12. Module according to claim 11 wherein said cover top is provided with generally inverted U-shaped mounting member for having said first electrical conductors mounted, thereunder.

13. Module according to claim 10 wherein said individual security cover includes a cover top and wherein said first electrical conductors and said plug are mounted under said cover top.

14. Module according to claim 13 wherein said cover top is provided underneath with a mounting member for having said first electrical conductors mounted thereover.

15. Module according to claim 1, 2, 7, 8 and 9 wherein said box-like structure provides an internal space for receiving a telephone circuit.

16. Telephone network interface apparatus, comprising:

an individual subscriber line module including a base;

a jack mounted on said base and subscriber terminals mounted on said base, said jack for being connected to an incoming telephone company line and said subscriber terminals for being connected to a subscriber premises line;

a plug connected to said subscriber terminals and for being removably received within said jack to interconnect said incoming telephone company line and said subscriber premises line and for being removed from said jack to provide a demarcation point between said incoming telephone company line and said subscriber premises line and to permit the plug of an operating telephone to be plugged into said jack to facilitate determination of whether a fault exists on said incoming telephone company line or said subscriber premises line;

an individual subscriber security cover having one end thereof mounted pivotally to one end of said base by hinge means, said hinge means comprising a pair of arms extending outwardly from said one end of said base, a shaft extending between said arms, and an outwardly extending U-shaped portion provided on said one end of said cover for wedgedly and rotatably receiving said shaft to provide pivotal movement to said cover;

padlock shackle receiving means mounted at the other end of said base and being positioned against the other end of said cover upon said cover being pivoted closed over said base, said padlock shackle receiving means for receiving the shackle of an individual subscriber padlock to permit said subscriber to lock said cover closed over said base and deny other subscribers access to said jack, subscriber terminals and plug; and telephone company personnel padlock override means including said padlock shackle receiving means for permitting telephone company personnel to override said padlock upon being locked and gain access to said jack, subscriber terminals and plug while said padlock remains locked.

17. Individual subscriber line module for being mounted adjacent a telephone company compartment having telephone terminals mounted therein for connection to an incoming telephone company line, said telephone company compartment provided with a pivotally mounted telephone company cover for being pivoted and fastened closed over said telephone terminals by telephone company personnel to deny others access to said telephone terminals, said module comprising:

mounting means having a jack and subscriber terminals mounted thereon, said jack for connection to said incoming telephone company line and said subscriber terminals for connection to a subscriber premises line;

a plug connected to said subscriber terminals and for being removably received within said jack to interconnect said incoming telephone company line and said subscriber premises line and for being removed from said jack to provide a demarcation point between said incoming telephone company line and said subscriber premises line and to permit the plug of an operating telephone to be plugged into said jack to facilitate determination of whether a fault exists on said incoming telephone company line or said subscriber premises line;

an individual subscriber security cover having one end thereof mounted pivotally at one end of said mounting means by hinge means, said hinge means including a pair of arms extending outwardly from said one end of said mounting means, a shaft extending between said arms, and an outwardly extending shaft receiving means provided on said one end of said cover for receiving said shaft to mount said cover pivotally;

padlock shackle receiving means mounted at the other end of said mounting means and for being positioned adjacent said cover upon said cover being pivoted closed over said mounting means and over said jack, subscriber terminals and plug, said padlock shackle receiving means for receiving the shackle of a subscriber padlock to lock said cover closed over said mounting means and to deny other subscribers access to said jack, subscriber terminals and plug; and intermediate means intermediate said padlock shackle receiving means and said telephone company cover and said intermediate means cooperating with said telephone company cover and said padlock shackle receiving means to provide override means to permit telephone company personnel to override said padlock upon being locked and upon said telephone company cover being unfastened by telephone company personnel to permit telephone company personnel to open said security cover and to have access to said jack, subscriber terminals and plug while said padlock remains locked.

18. Telephone network interface apparatus according to claim 17 wherein said intermediate means comprise an inwardly extending member provided on the underside of said telephone company cover.

19. Module for being mounted removably to telephone network interface apparatus and for interconnecting at least one individual subscriber premises line with at least one individual incoming telephone company line, comprising:

a base;

at least one pair of subscriber terminals mounted on said base for connection to said subscriber premises;

at least one plug connected to said pair of subscriber wiring terminals by first electrical conductors;

at least one jack mounted on said base and provided with second electrical conductors for connecting said jack to said incoming telephone company line, said jack for having said plug plugged therein to interconnect said pair of subscriber wiring terminals and thereby said subscriber premises line to said incoming telephone company line and said plug for being unplugged from said jack to provide a demarcation point between said subscriber premises line and said incoming telephone company line, and upon said plug being unplugged from said jack said jack for receiving the plug of an operating telephone to facilitate determination of whether a fault exists on said subscriber premises line or said incoming telephone company line;

safety means for covering and denying a subscriber access to said subscriber terminals while said plug is plugged into said jack and while telephone ringing voltage is applied to said incoming telephone company line and to said subscriber terminals whereby telephone ringing voltage shock hazard to said subscriber at said subscriber terminals is prevented; and mounting means for mounting said module removably to said telephone network interface apparatus.

20. Module for being mounted removably to telephone network interface apparatus and for interconnecting at least one individual subscriber premises line with at least one individual incoming telephone company line, comprising:

a base;

at least one pair of subscriber terminals mounted on said base for connection to said subscriber premises;

at least one plug connected to said pair of subscriber wiring terminals by first electrical conductors;

at least one jack mounted on said base and provided with second electrical conductors for connecting said jack to said incoming telephone company line, said jack for having said plug plugged therein to interconnect said pair of subscriber wiring terminals and thereby said subscriber premises line to said incoming telephone company line and said plug for being unplugged from said jack to provide a demarcation point between said subscriber premises line and said incoming telephone company line, and upon said plug being unplugged from said jack said jack for receiving the plug of an operating telephone to facilitate determination of whether a fault exists on said subscriber premises line or said incoming telephone company line;

safety means operable only upon said plug being plugged into said jack and for preventing potential telephone ringing shock hazard to a subscriber at said subscriber wiring terminals upon telephone ringing voltage being applied to said incoming telephone company line and to said subscriber wiring terminals; and mounting means for mounting said module removably to said telephone network interface apparatus.

21. Module for being mounted removably to telephone network interface apparatus and for interconnecting at least one individual subscriber premises line with at least one individual incoming telephone company line, comprising:

a base;

at least one pair of subscriber terminals mounted on said base for connection to said subscriber premises;

at least one plug connected to said pair of subscriber wiring terminals by first electrical conductors;

at least one jack mounted on said base and provided with second electrical conductors for connecting said jack to said incoming telephone company line, said jack for having said plug plugged therein to interconnect said pair of subscriber wiring terminals and thereby said subscriber premises line to said incoming telephone company line and said plug for being unplugged from said jack to provide a demarcation point between said subscriber premises line and said incoming telephone company line, and upon said plug being unplugged from said jack said jack for receiving the plug of an operating telephone to facilitate determination of whether a fault exists on said subscriber premises line or said incoming telephone company line;

a subscriber security cover mounted pivotally to said base and for being pivoted over and covering said subscriber terminals, said plug mounted on said cover whereby upon said plug being plugged into said jack said cover covers said subscriber wiring terminals and denies a subscriber access thereto whereby potential telephone ringing voltage shock hazard to said subscriber is prevented upon telephone ringing voltage being applied to said incoming telephone line and to said subscriber terminals; and mounting means for mounting said module removably to said telephone network interface apparatus.

22. Module for being mounted removably to telephone network interface apparatus and for interconnecting at least one individual subscriber premises line with at least one individual incoming telephone company line, comprising:

a base;

at least one pair of subscriber terminals mounted on said base for connection to said subscriber premises;

at least one plug connected to said pair of subscriber wiring terminals by first electrical conductors;

at least one jack mounted on said base and provided with second electrical conductors for connecting said jack to said incoming telephone company line, said jack for having said plug plugged therein to interconnect said pair of subscriber wiring terminals and thereby said subscriber premises line to said incoming telephone company line and said plug for being unplugged from said jack to provide a demarcation point between said subscriber premises line and said incoming telephone company line, and upon said plug being unplugged from said jack said jack for receiving the plug of an operating telephone to facilitate determination of whether a fault exists on said subscriber premises line or said incoming telephone company line;

a subscriber security cover mounted pivotally to said base and said plug mounted on said cover to cause said cover to cover at least said subscriber terminals upon said plug being plugged into said jack thereby preventing telephone ringing voltage shock hazard to said subscriber Upon telephone ringing voltage being applied to said subscriber terminals, and to cause said plug to be unplugged from said jack upon said cover being pivoted open to provide said subscriber access to said subscriber terminals; and mounting means for mounting said module removably to said telephone network interface apparatus.

* * * * *